United States Patent
Kaneko et al.

(10) Patent No.: US 6,945,202 B2
(45) Date of Patent: Sep. 20, 2005

(54) FREE PISTON ENGINE AND POWER GENERATION SYSTEM THEREWITH

(75) Inventors: Takashi Kaneko, Nagoya (JP); Yasumasa Hagiwara, Kariya (JP); Wataru Mii, Toyota (JP); Kazuhiro Ojika, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/977,935

(22) Filed: Nov. 1, 2004

(65) Prior Publication Data

US 2005/0109295 A1 May 26, 2005

(30) Foreign Application Priority Data

Nov. 20, 2003 (JP) .................................. 2003-391226

(51) Int. Cl.⁷ ............................................. F02B 71/00
(52) U.S. Cl. ................................. 123/46 R; 417/521
(58) Field of Search ...................... 123/46 R; 417/364, 417/380, 512

(56) References Cited

U.S. PATENT DOCUMENTS

| | | | |
|---|---|---|---|
| 3,183,900 A | * | 5/1965 | Wilhelm .................. 123/41.78 |
| 3,370,576 A | | 2/1968 | Huber |
| 4,450,685 A | | 5/1984 | Corey |
| 4,975,026 A | * | 12/1990 | Pruszenski, Jr. ............ 417/340 |
| 6,532,916 B2 | | 3/2003 | Kerrebrock |
| 6,554,585 B1 | | 4/2003 | Maracchi |

\* cited by examiner

*Primary Examiner*—Mahmoud Gimie
(74) *Attorney, Agent, or Firm*—Nixon & Vanderhye P.C.

(57) ABSTRACT

A first piston connected to a first shaft and a second piston connected to a second shaft are supported within a housing by using a first leaf-spring unit and a second leaf-spring unit, respectively. Therefore, axial movement of the first shaft or the second shaft can be allowed, while circumferential rotational movement and radial movement can be restricted. The first leaf-spring unit includes two leaf-spring groups that are disposed in a row around the first shaft in the direction of the axis of the first shaft; similarly, the second leaf-spring unit includes two leaf-spring groups that are disposed in a row around the second shaft in the direction of the axis of the second shaft. Therefore, inclinations of the first shaft and the second shaft can be decreased. This results in reduction in contact between the first and second shafts and a cylinder within the housing and friction due to the contact.

16 Claims, 10 Drawing Sheets

FIG. 1 (FIRST EMBODIMENT)

FIG. 5 (SECOND EMBODIMENT)

FIG. 6 (THIRD EMBODIMENT)

FREE PISTON ENGINE AND POWER GENERATION SYSTEM THEREWITH

CROSS REFERENCE TO RELATED APPLICATIONS

This application is based on and incorporates herein by reference Japanese Patent Application No. 2003-391226 filed on Nov. 20, 2003.

FIELD OF THE INVENTION

The present invention relates to a free piston engine and a power generation system therewith.

BACKGROUND OF THE INVENTION

Conventionally, a free piston engine is known as an engine that needs no crank, no connecting rod, and no piston pin bearing and that can be compact. Further, in Patent document 1, a power generation system uses a free piston engine as its power source. Here, the free piston engine has a magnet portion disposed in a center of an axial direction, and a shaft that has pistons at both ends. The pistons in the both ends are contained within both cylinders, respectively. The both cylinders alternately undergo explosions of gases including gasoline, so that the magnet portion is axially reciprocated.

A different type of a free piston engine is also known in Patent document 2. Here, two opposing pistons are contained within a single cylinder. Pressure chambers are provided rearwards of the respective pistons. Gases are exploded within a space between the opposing pistons, so that axial driving force is generated in a direction. Gases filled in each of the pressure chambers rearwards of the piston are then compressed, so that the piston is pushed back in the other direction. The piston is thereby returned towards the combustion chamber to reciprocate. Further, in Patent document 3, a free piston engine with external-combustion of the Starling cycle is known as a free piston engine that uses a coil spring for pushing back the piston.

Patent document 1: JP2001-241302A
Patent document 2: U.S. Pat. No. 3,370,576
Patent document 3: U.S. Pat. No. 4,450,685

To maintain the reciprocating motion, pushing back of the piston towards the combustion chamber becomes necessary after a combustion stroke within the combustion chamber. In Patent document 1, the combustion stroke takes place alternately in the both-end combustion chambers, so that the combustion stroke in the one-end combustion chamber pushes back the piston towards the other-end combustion chamber. However, in a two-cylinder free piston engine constituted by the two combustion chambers, periodic vibrations due to the explosions cannot be easily decreased. Therefore, the number of cylinders needs to be increased so that the generated vibrations can be offset. This results in a large-sized free piston engine due to the multiple cylinders, which cancels an advantage of the free piston engine that is suitable for reducing the size.

In Patent document 2, two pistons face each other within a single cylinder, so that the two pistons reciprocate in the phases opposite to each other. The generated vibrations can be thereby decreased. However, to reciprocate the two pistons in the opposite phases, the shifted piston in the combustion stroke must be returned back by a pushing-back method. Suppose that the piston is returned back by the gases filled within the pressure chamber. Here, each time the gases are compressed and expanded, the kinetic energy of the pistons is converted into the thermal energy that is released. As a result, the energy generated from the explosion of the gases within the combustion chamber cannot be effectively extracted. Further, the gases generate non-linear reaction force to a displacement amount of the piston, and further variable properties to temperatures or pressures. Moreover, this requires a method for filling the gases within the pressure chamber, and a valve for controlling gas pressure within the pressure chamber. This eventually entails difficulty in control of the free piston engine, complication in structure, and a large size.

In the above Patent documents 1, 2, 3, the movements of the pistons are performed by sliding with the cylinders. The contact surfaces of the pistons and cylinders easily undergo friction, resulting in decrease in durability. Further, the circumferential rotations of the pistons are not easily controlled. Therefore, when the free piston engine is applied to the motive engine for a generator, a shaft connected to a piston needs being provided with a magnet portion that is disposed in a cylindrical form uniformly around the circumference of the shaft. Suppose that the magnet portion is disposed in the cylindrical form and that electric power or driving force is generated from the generator. The surface area where the magnetic field varies becomes small, which results in decrease in efficiency. When the surface area where the magnetic field varies is expanded, the diameter of the magnet portion must be enlarged. This entails increase in weight and size in the free piston engine.

SUMMARY OF THE INVENTION

It is an object of the present invention to provide a highly durable free piston engine where the vibration is decreased without the size enlarged. Further, it is another object of the present invention to provide a power generation system where output can be increased without the size enlarged.

To achieve the above object, a free piston engine is provided with the following. The free piston engine comprises a housing, a first piston, a second piston, a first shaft, a second shaft, a first spring unit, and a second spring unit. The housing includes a cylinder. The first piston is contained within the cylinder and capable of being axially reciprocated. The second piston is contained within the cylinder, capable of being axially reciprocated, and opposed to the first piston, wherein a combustion chamber is formed as a space surrounded by the first piston, the second piston, and the housing. The first shaft is connected with the first piston at a first end of the first piston and capable of being axially reciprocated along with the first piston, wherein the first end of the first piston is opposite to a second end of the first piston, wherein the second end of the first piston faces the combustion chamber. The second shaft is connected with the second piston at a third end of the second piston and capable of being axially reciprocated along with the second piston, wherein the third end of the second piston is opposite to a fourth end of the second piston, wherein the fourth end of the second piston faces the combustion chamber. The first spring unit is connected with the first shaft, supports the first piston and the first shaft, applies to the first shaft a force that corresponds to a first displacement of the first piston and has a direction opposite to a direction of the first displacement. The second spring unit is connected with the second shaft, supports the second piston and the second shaft, applies to the second shaft a force that corresponds to a second displacement of the second piston and has a direction opposite to a direction of the second displacement.

In this structure, the first spring unit and the second spring unit accumulate as elastic potential energy a part of the energy that the first piston and the second piston obtain because of the explosion in the combustion chamber. The first spring unit and the second spring unit then regenerate the accumulated elastic potential energy into kinetic energy to thereby push back the first piston and the second piston towards the combustion chamber. The loss in the energy can be thereby decreased, which increases the efficiency. Further, the first piston and the second piston are disposed oppositely to each other, so that vibrations due to the movements of the first piston and the second piston are offset by each other. This prevents necessity of increase in the number of the cylinders for decreasing the vibrations. Further, the first piston and the second piston are supported by the first spring unit and the second spring unit, respectively. This decreases contact of the first piston and the second piston with the housing forming the cylinder, and friction due to this contact. Therefore, without the free piston engine becoming large-sized, the vibration can be decreased and the durability can be enhanced.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
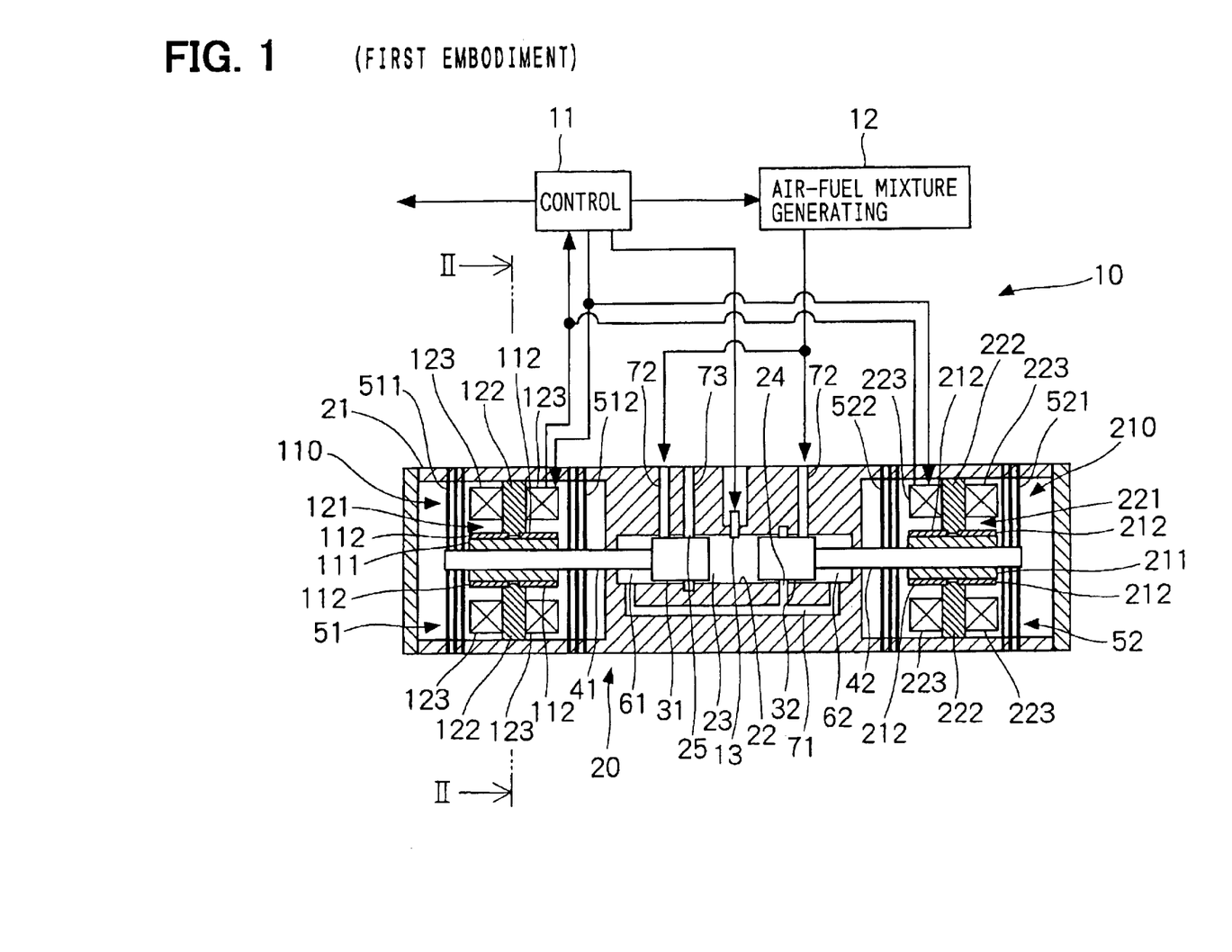
FIG. 1 is a schematic cross sectional view showing a power generation system according to a first embodiment of the present invention.

A free piston engine according to a first embodiment of the present invention is directed to a power generation system, of which a schematic cross sectional view is shown in FIG. 1. The power generation system 10 includes a linear motor generator as a loading unit that applies a load to the free piston engine. For instance, the power generation system 10 is connected with a motor via an external battery (not shown). For instance, the power generation system 10 is used as a motive energy source for a small-sized vehicle or a motive energy source for a series-type hybrid vehicle.

The power generation system 10 includes a free piston engine 20 that is integrated into the power generation system 10; a first linear motor generator 110; and a second linear motor generator 210. The power generation system 10 further includes a control unit 11, an air-fuel mixture generating unit 12, and an ignition plug 13 as an ignition unit. The control unit 11 executes an overall control for the power generation system 10, i.e., for the free piston engine 20, the first linear motor generator 110, the second linear motor generator 210, the air-fuel mixture generating unit 12, the ignition plug 13 etc.

The air-fuel mixture generating unit 12 generates an air-fuel mixture of a given air-fuel ratio from fuel and air. The control unit 11 controls the air-fuel ratio of the air-fuel mixture generated in the air-fuel mixture generating unit 12, and a feeding amount of the air-fuel mixture fed to the free piston engine 20 from the air-fuel mixture generating unit 12. In this embodiment, the fuel of the free piston engine 20 includes, e.g., gaseous fuel such as hydrogen or methane. Further, the fuel can also include flammable gas such as butane and propane, and flammable liquid such as gasoline and light oil.

The free piston engine 20 includes a housing 21, a first piston 31, a second piston 32, a first shaft 41, a second shaft 42, a first leaf-spring unit 51 as a first spring member, and a second leaf-spring unit 52 as a second spring member. The first piston 31, the first shaft 41, and the first leaf-spring unit 51 constitute a first driving system. The second piston 32, the second shaft 42, and the second leaf-spring unit 52 constitute a second driving system. The housing 21 includes a cylindrical inside wall surface to thereby form a cylinder 22. The first piston 31 and the second piston 32 are contained within the cylinder 22 so that those pistons 31, 32 can be reciprocated in an axial direction of the cylinder 22. The first piston 31 and the second piston 32 oppose each other. The first shaft 41 is connected with the first piston 31 at, of the first piston 31, a rear end opposite to a front end facing a combustion chamber 23. The second shaft 42 is connected with the second piston 32 at, of the second piston 32, a rear end opposite to a front end facing the combustion chamber 23. The combustion chamber 23 is formed as a space surrounded by: of the first piston 31, a front end surface opposing the second piston 32; of the second piston 32, a front end surface opposing the first piston 31; and the inside wall surface of the housing 21 forming the cylinder 22. The combustion chamber 23 changes its volume depending on the axial movement of the first piston 31 and the second piston 32.

The combustion chamber 23 includes a scavenging port 24 and an exhaust port 25. A first sub-chamber 61 is formed at a space surrounded by the rear end surface of the first piston 31 and the housing 21. A second sub-chamber 62 is formed at a space surrounded by the rear end surface of the second piston 32 and the housing 21. The scavenging port 24 opening to the combustion chamber 23 is fluidly communicated with the air-fuel mixture generating unit 12 via a scavenging passage 71, the first sub-chamber 61, the second sub-chamber 62 and an intake passage 72. The air-fuel mixture generated in the air-fuel mixture generating unit 12 is thereby fed from the scavenging port 24 to the combustion chamber 23. The exhaust port 25 is fluidly communicated with an outside of the free piston engine 20 via an exhaust passage 73. Here, the scavenging port 24, the scavenging passage 71, and the intake passage 72 are used as a feeding path, while the exhaust port 25 and the exhaust passage 73 are used as an exhaust path. The ignition plug 13 is provided in the combustion chamber 23. The ignition plug 13 receives an ignition control signal from the control unit 11 at a given timing. The ignition plug 13 ignites the air-fuel mixture charged into the combustion chamber 23 based on the received ignition control signal. The outer diameters of the first piston 31 and the second piston 32 are slightly smaller than an inner diameter of the housing 21 forming the cylinder 22, so that the combustion chamber 23, the first sub-chamber 61, and the second sub-chamber 62 are individually air-sealed by the first piston 31, the second piston 32, and the housing 21.

Figure 3:
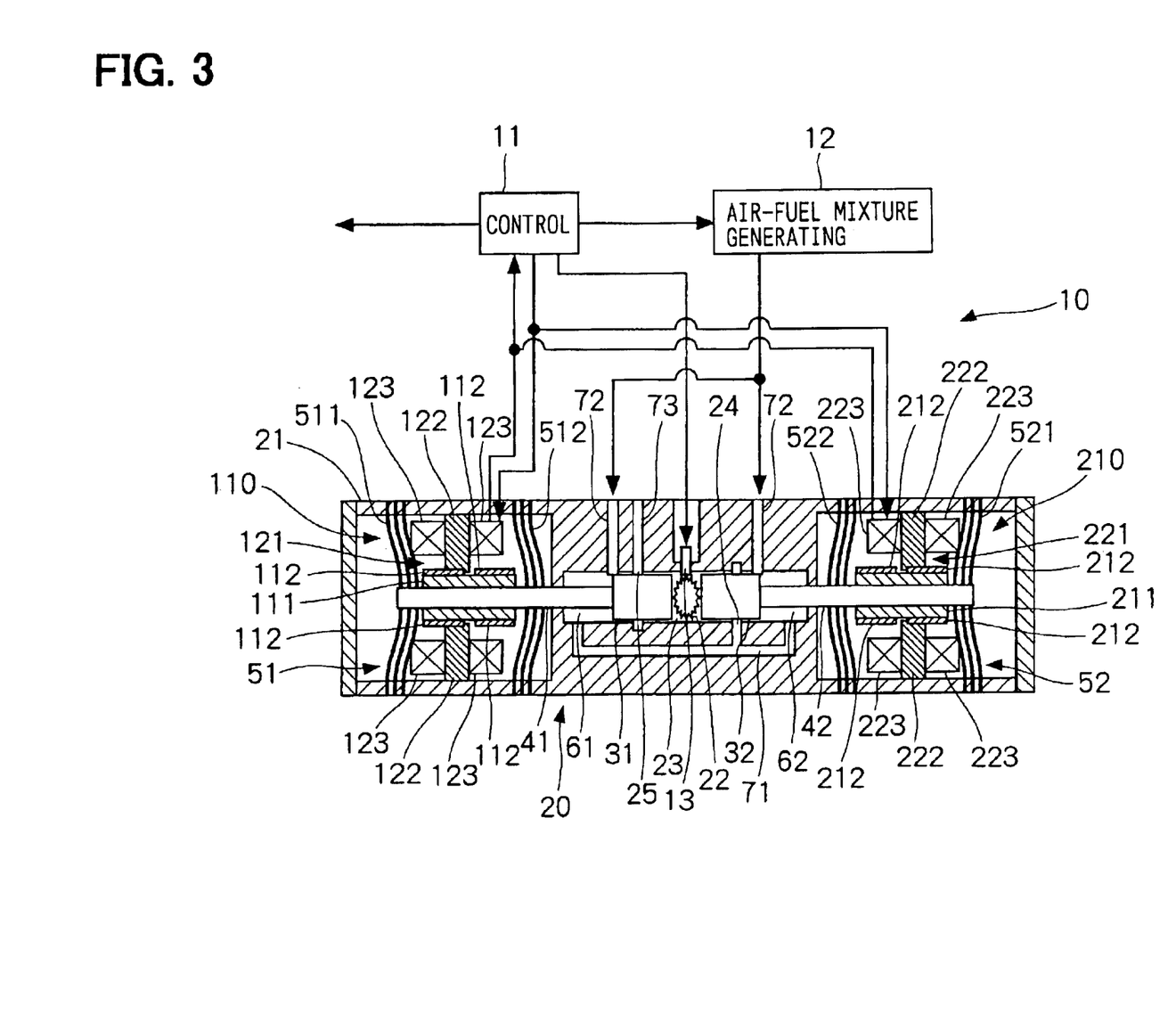
FIG. 3 is a schematic cross sectional view showing a power generation system in a compression stroke according to the first embodiment.

The first leaf-spring unit 51 is connected with the first shaft 41 rearwards of the first piston 31. The first leaf-spring unit 51 supports, within the housing 21, the first piston 31 and the first shaft 41 so that they can axially reciprocate. The first leaf-spring unit 51 applies a force corresponding to a displacement amount of the first piston 31 and first shaft 41, to the first piston 31 and the first shaft 41 in a direction opposite to that of the displacement amount. Namely, when the first piston 31 is moved towards the combustion chamber 23 from the position, as shown in FIG. 3, the first leaf-spring unit 51 pushes the first piston 31 and the first shaft 41 away from the combustion chamber 23 (rewards of the first piston 31). By contrast, when the first piston 31 is moved away from the combustion chamber 23 from the position shown in FIG. 1, the first leaf-spring unit 51 pushes the first piston 31 and the first shaft 41 towards the combustion chamber 23 (forwards of the first piston 31).

Likewise, the second leaf-spring unit 52 is connected with the second shaft 42 rearwards of the second piston 32. The second leaf-spring unit 52 supports, within the housing 21, the second piston 32 and the second shaft 42 so that they can axially reciprocate. The second leaf-spring unit 52 applies a force corresponding to a displacement amount of the second piston 32 and second shaft 42, to the second piston 32 and the second shaft 42 in a direction opposite to that of the displacement amount. Namely, when the second piston 32 is moved towards the combustion chamber 23 from the position shown in FIG. 1, the second leaf-spring unit 52 pushes the second piston 32 and the second shaft 42 away from the combustion chamber 23 (rewards of the second piston 32). By contrast, when the second piston 32 is moved away from the combustion chamber 23 from the position shown in FIG. 1, the second leaf-spring unit 52 pushes the second piston 32 and the second shaft 42 towards the combustion chamber 23 (forwards of the second piston 32).

The first leaf-spring unit 51 includes a first leaf-spring group 511 and a second leaf-spring group 512, both of which are provided in a row in the axial direction of the first shaft 41. The second leaf-spring unit 52 includes a first leaf-spring group 521 and a second leaf-spring group 522, both of which are provided in a row in the axial direction of the second shaft 42.

Each of the leaf-spring groups 511, 512, 521, 522 includes the multiple leaf springs that are laminated in approximately parallel to one another. The first leaf-spring unit 51 firmly connects the first shaft 41 and the housing 21, so that first leaf-spring unit 51 is firmly fastened to the first shaft 41 and the housing 21. Likewise, the second leaf-spring unit 52 firmly connects the second shaft 42 and the housing 21, so that second leaf-spring unit 52 is firmly fastened to the second shaft 42 and the housing 21. In this structure, the first leaf-spring unit 51 and the second leaf-spring unit 52 allow the first shaft 41 and the second shaft 42 to be axially reciprocated, and limit the radial movements and circumferential rotation movements of the first shaft 41 and the second shaft 42, respectively.

The first leaf-spring unit 51 includes the two leaf-spring groups 511, 512 in axially different positions, and the second leaf-spring unit 52 includes the two leaf-spring groups 521, 522 in axially different positions. Each of the first shaft 41 and the second shaft 42 is thereby supported in the two axially different positions. This can decrease, with respect to their axes, inclinations in the first shaft 41 and the second shaft 42, respectively. Further, each of the first leaf-spring unit 51 and the second leaf-spring unit 52 is formed of the multiple leaf-spring groups, so that the number of leaf-springs within a single leaf-spring group can be decreased. This does not require high accuracy in manufacturing the leaf springs constituting the leaf-spring group, resulting in decrease in manufacturing man-power.

Figure 2:
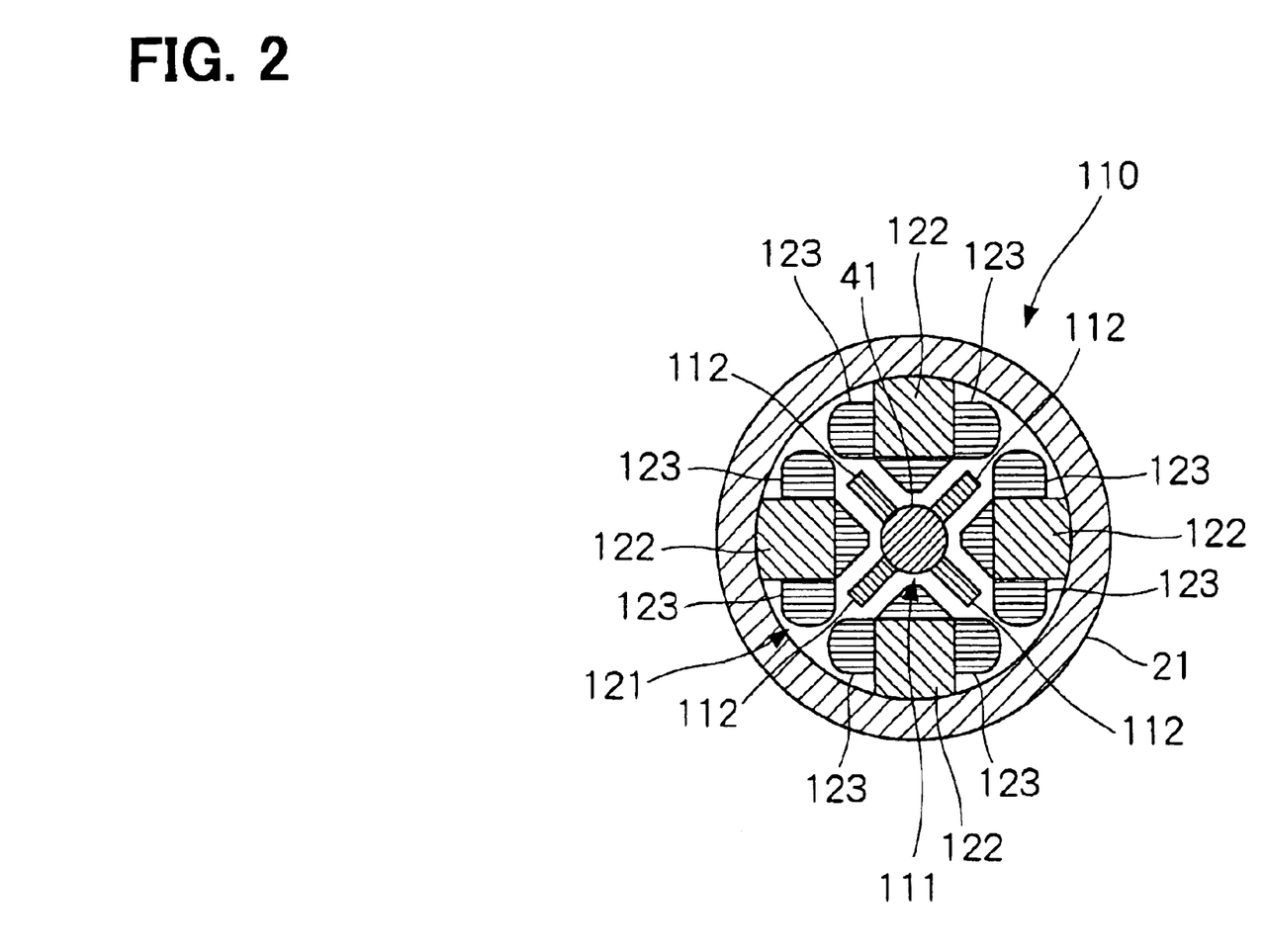
FIG. 2 is a cross sectional view taken from a line II—II in FIG. 1.

The first linear motor generator 110 includes a first movable member 111 and a first stator 121. The first movable member 111 includes a permanent magnet 112 provided in the nonmagnetic first shaft 41, and is axially reciprocated along with the first shaft 41. The permanent magnet 112 of the first movable member 111 protrudes radially from the first shaft 41 as shown in FIG. 2. The first movable member 111 is disposed between the first leaf-spring group 511 and second leaf-spring group 512 of the first leaf-spring unit 51 in the axial direction of the first shaft 41 as shown in FIG. 1. The first stator 121 surrounds the outer surface of the first movable member 111, and includes a coil 123 that is fixed to a yoke 122. The yoke 122 is fixed to the housing 21 or can be integrated into the housing 21.

The second linear motor generator 210 includes a second movable member 211 and a second stator 221. The second movable member 211 includes a permanent magnet 212 provided in the nonmagnetic second shaft 42, and is axially reciprocated along with the second shaft 42. The permanent magnet 212 of the second movable member 211 protrudes radially from the second shaft 42 as shown in FIG. 2. The second movable member 211 is disposed between the first leaf-spring group 521 and second leaf-spring group 522 of the second leaf-spring unit 52 in the axial direction of the second shaft 42 as shown in FIG. 1. The second stator 221 surrounds the outer surface of the second movable member 211, and includes a coil 223 that is fixed to a yoke 222. The yoke 222 is fixed to the housing 21 or can be integrated into the housing 21.

The first stator 121 of the first linear motor generator 110 and the second stator 221 of the second linear motor generator 210 are electrically connected with the control unit 11. When electric power is generated from the first linear motor generator 110 and the second linear motor generator 210, namely when they work as a power generator, the control unit 11 feeds the electric power generated from the first linear motor generator 110 and the second linear motor generator 210 to an external battery (not shown). By contrast, when driving force is generated from the first linear motor generator 110 and the second linear motor generator 210, namely when they work as a linear motor, the control unit 11 feeds electric power stored in the external battery to the first stator 121 of the first linear motor generator 110 and the second stator 221 of the second linear motor generator 210.

Next, operation of the power generation system 10 will be explained below. The free piston engine 20 of the first embodiment is a two-stroke engine. While the first piston 31 and the second piston 32 axially reciprocate one time, a compression stroke of compressing and igniting and an expansion stroke of combusting and scavenging take place. The free piston engine 20 repeats the compression stroke and the expansion stroke. Hereinafter, the position where the first piston 31 and the second piston 32 are moved the most towards (the center of) the combustion chamber 23 is referred to as "top dead center." By contrast, the position where the first piston 31 and the second piston 32 are moved the most away from (the center of) the combustion chamber 23 (or moved the most rearwards of the pistons 31, 32) is referred to as "bottom dead center." Here, the displacement amount is defined as a distance from the "top dead center," Namely, the displacement amount when the piston is located at the top dead center is the minimum, while the displacement amount when the piston is located at the bottom dead center is the maximum.

When the first piston 31 and the second piston 32 move towards the top dead center, the air-fuel mixture charged into the combustion chamber 23 is compressed. At the timing when the first piston 31 and the second piston 32 reach the top dead center, the control unit 11 inputs the ignition control signal to the ignition plug 13. The ignition plug 13 thereby ignites the air-fuel mixture within the combustion chamber 23. Here, when the air-fuel mixture compressed within the combustion chamber 23 is automatically ignited because of a diesel cycle, the ignition plug 13 is unnecessary in theory. However, igniting of the air-fuel mixture with the ignition plug 13 results in stabilization in the operation of the free piston engine 20. In particular, in a starting stage or unsteady stage of the operation, igniting with the ignition plug 13 becomes effective. By contrast, the operation in the Otto cycle necessitates use of the ignition plug 13.

When the first piston 31 and the second piston 32 move towards the top dead center, the first sub-chamber 61 and the second sub-chamber 62 increase their volumes and decrease their pressures. Therefore, the air-fuel mixture generated by the air-fuel mixture generating unit 12 is charged into the first sub-chamber 61 and the second sub-chamber 62 via the intake passage 72.

When the ignition plug 13 ignites the air-fuel mixture, the air-fuel mixture fed into the combustion chamber 23 is exploded by following the combustion of the fuel. The pressure in the combustion chamber 23 thereby increases rapidly. The combustion gases generated from the combustion of the fuel are expanded within the combustion chamber 23, the first piston 31 and the second piston 32 are pushed towards the bottom dead center by the expanding combustion gases. The first piston 31 and the second piston 32 are thereby moved towards the bottom dead center. This eventually increases the volume in the combustion chamber 23 and decreases the pressure, in the combustion chamber 23. Simultaneously, this decreases the volumes in the first sub-chamber 61 and the second sub-chamber 62 and increases the pressures in the first sub-chamber 61 and the second sub-chamber 62. Hence, the air-fuel mixture charged into the first sub-chamber 61 and the second sub-chamber 62 flows into the combustion chamber 23 via the scavenging passage 71.

Further, at this moment, moving of the first piston 31 and the second piston 32 towards the bottom dead center results in moving the first shaft 41 and the second shaft 42 along with the first piston 31 and the second piston 32 away from the combustion chamber 23. The first leaf-spring unit 51 and the second leaf-spring unit 52 are thereby elastically deformed, so that they accumulate the energy that pushes back the first shaft 41 and the second shaft 42 towards the combustion chamber 23.

When the first piston 31 and the second piston 32 reach the bottom dead center, the first piston 31 and the second piston 32 along with the first shaft 41 and the second shaft 42 are pushed back towards the combustion chamber 23 because of the accumulated energy in the first leaf-spring unit 51 and the second leaf-spring unit 52, respectively. This compresses the air-fuel mixture charged into the combustion chamber 23 and exhausts the combustion gases remaining within the combustion chamber 23 to the outside via the exhaust passage 73.

Figure 4:
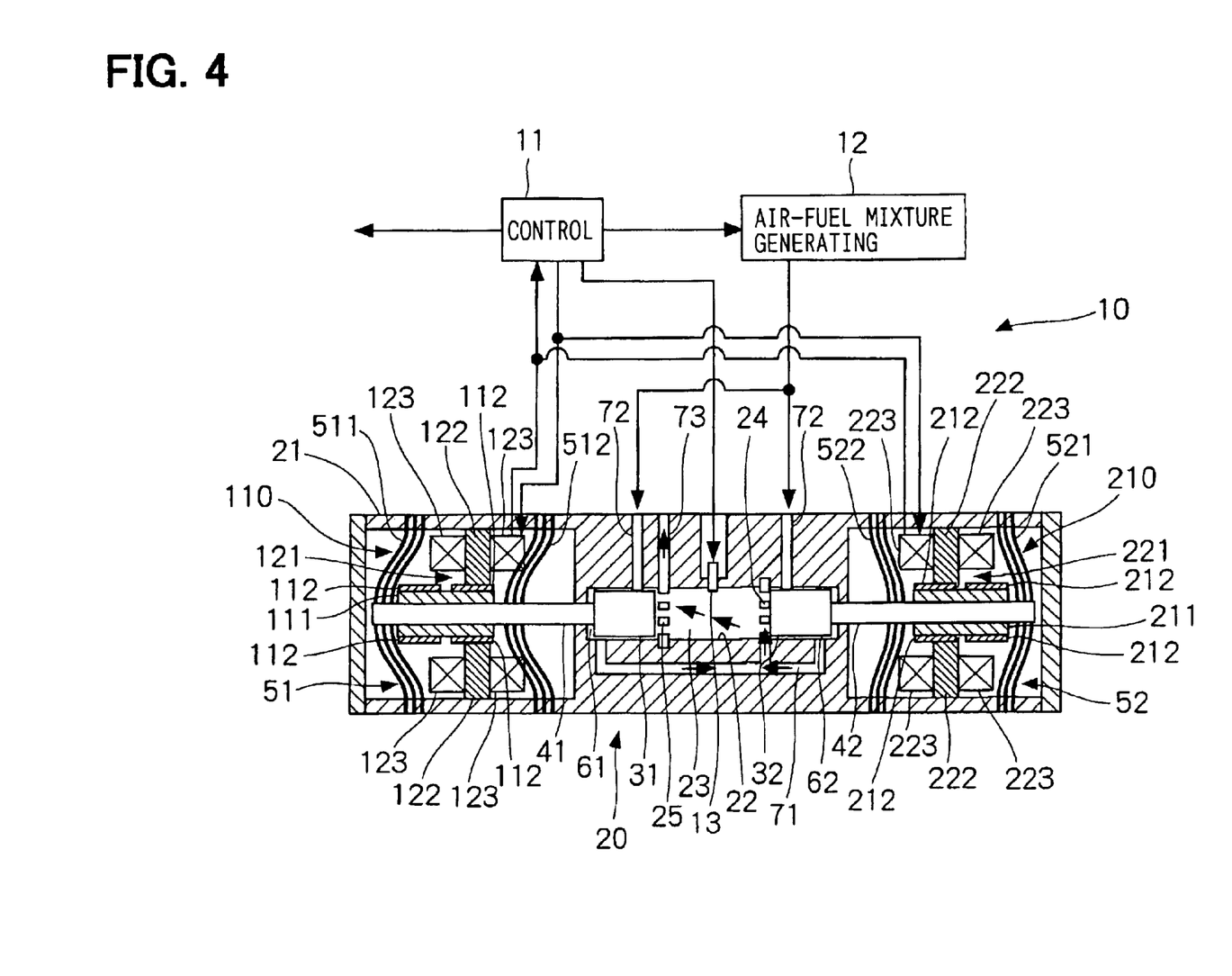
FIG. 4 is a schematic cross sectional view showing a power generation system in an expansion stroke according to the first embodiment.

In this embodiment, as shown in FIG. 4, the scavenging port 24 and the exhaust port 25 are disposed asymmetrically with respect to the axial center of the cylinder 22. Namely, the exhaust port 25 is disposed closer to the axial center of the cylinder 22 than the scavenging port 24 is. Suppose that the displacement amounts of the first piston 31 and the second piston 32 are equal. In this case, under the expansion stroke, the exhaust port 25 is opened to the combustion chamber 23 earlier than the scavenging port 24 is. By contrast, under the compression stroke, the exhaust port 25 is closed to the combustion chamber 23 later than the scavenging port 24 is. This produces, under the compression stroke, a one-way gas flow from the scavenging port 24 to the exhaust port 25 within the combustion chamber 23. Namely, uni-flow scavenging is formed within the combustion chamber 23, so that residual gases are decreased within the combustion chamber 23.

In synchronization to the timing when the first piston 31 and the second piston 32 reach the top dead center, the control unit 11 inputs the ignition control signal to the ignition plug 13. The above-described strokes are repeated, so that the free piston engine 20 continues to operate. Here, the free piston engine 20 operates in such a manner that the displacement amounts in the first piston 31 and the second piston 32 are equal to each other but the phases of the displacements in the first piston 31 and the second piston 32 are opposite to each other.

Next, operations of the first linear motor generator 110 and the second linear motor generator 210 will be explained below. Simultaneous with the reciprocated movements of the first piston 31 and the second piston 32, the first shaft 41 connected with the first piston 31 and the second shaft 42 connected with the second piston 32 are axially reciprocated. The first movable member 111 provided in the first shaft 41 is thereby moved relatively with respect to the first stator 121, while the second movable member 211 provided in the second shaft 42 is thereby moved relatively with respect to the second stator 221. This varies magnetic fields around the first stator 121 and the second stator 221, generating electric powers in the coils 123, 223 in the first stator 121 and the second stator 221, respectively. The electric powers generated from the first stator 121 and the second stator 221 are stored in the battery via the control unit 11.

The control unit 11 detects phases in the electric powers generated from the first linear motor generator 110 and the second linear motor generator 210. The phases in the electric powers are varied by movements of the first movable member 111 and the second movable member 211, respectively. Namely, the relative positional relationship between the first movable member 111 and the first stator 121 or the relative positional relationship between the second movable member 211 and the second stator 221 varies the magnitude and phase in voltage and current generated from the first linear motor generator 110 or the second linear motor generator 210, respectively. The control unit 11 detects the positions of the first movable member 111 and the second movable member 211 by detecting the above phases, respectively. Then, the control unit 11 detects an operating state of the free piston engine 20 by the detected positions of the movable members 111, 211. The control unit 11 outputs the control signal to the air-fuel mixture generating unit 12 and the ignition control signal to the ignition plug 13, based on the detected operating state of the free piston engine 20. The control unit 11 further outputs electric field control signals for controlling the electric powers applied to the stators 121, 221 of the linear motor generators 110, 210, respectively.

Further, the control unit 11 provides the first stator 121 and the second stator 221 with the electric power by outputting the electric field control signals. When the first stator 121 and the second stator 221 receive the electric powers, they generate magnetic fields therearound. Magnetic forces are thereby generated between the first stator 121 and the first movable member 111 and between the second stator 221 and the second movable member 211. Therefore, by providing the first stator 121 and the second stator 221 with the electric powers, the first driving system including the first movable member 111 and the second driving system including the second movable member 211 are varied in their motion states, respectively. Namely, by providing the first linear motor generator 110 and the second linear motor generator 210 with the electric powers, the control unit 11 causes the first linear motor generator 110 and the second linear motor generator 210 to work as linear motors, thereby controlling the free piston engine 20. As a result, the first linear motor generator 110 and the second linear motor generator 210 provide the first driving system and the second driving system with the driving forces, respectively.

Since the control unit 11 controls the operation of the free piston engine 20, the first linear motor generator 110 and the second linear motor generator 210 assist operations in the first driving system and the second driving system, respectively. For instance, suppose that the air-fuel mixture is compressed within the combustion chamber 23 in the compression stroke and that spring forces of the first leaf-spring unit 51 or the second leaf-spring unit 52 is insufficient in pushing back the first piston 31 or the second piston 32, respectively. Further, suppose that in the expansion stroke the displacement amount of the first piston 31 or the second piston 32 becomes excessively large. In these cases, the control unit 11 provides the first linear motor generator 110 and the second linear motor generator 210 with the electric powers, so that the displacement amounts of the first piston 31 and the second piston 32 can be adjusted. Yet further, when the displacement amounts of the first piston 31 and the second piston 32 are different from each other, the control unit 11 adjusts the electric powers to the first linear motor generator 110 and the second linear motor generator 210. The control unit 11 controls the two displacement amounts so that the displacement amounts of the first piston 31 and the second piston 32 are equal to each other but the phases of the displacements of the first piston 31 and the second piston 32 are opposite to each other.

As explained above, in the first embodiment, the first leaf-spring unit 51 and the second leaf-spring unit 52 support the first shaft 41 connected with the first piston 31 and the second shaft 42 connected with the second piston 32, respectively. This allows the axial movements of the first shaft 41 and the second shaft 42, but restricts the radial movements and the circumferential rotation movements of the first shaft 41 and the second shaft 42. The first leaf-spring unit 51 is disposed in two positions in the axial direction of the first shaft 41 to sandwich the first movable member 111, while the second leaf-spring unit 52 is disposed in two positions in the axial direction of the second shaft 42 to sandwich the second movable member 211. This decreases the inclinations in the first shaft 41 and the second shaft 42, resulting in reduction in contact and friction due to the contact between the inside wall surface of the housing 21 and each of the first and second pistons 31, 32. The durability in the free piston engine 20 can be thereby enhanced. Reduction of the contact dispenses with lubricating agents, relieving maintenance of the free piston engine 20. For instance, when a two-stroke engine is lubricated with lubricating oil, the lubricating oil is burned within the combustion chamber 23 along with the fuel, resulting in necessity in periodically replenishing the lubricating oil. In the above-described structure in this embodiment, the lubrication between the housing 21 and each of the first piston 31 and the second piston 32 becomes unnecessary, dispensing with the replenishing of the lubricating oil to thereby make the maintenance easy.

Further, since the radial movements and the circumferential rotational movements of the first piston 31 and the second piston 32 are restricted, flexibility of the shapes of the first movable member 111 and the second movable member 211 can be improved. This enables the permanent magnets 112, 212 provided in the first movable member 111 and the second movable member 211 to be shaped radially without being limited to the cylindrical shape. Therefore, in the first linear motor generator 110 and the second linear motor generator 210, size and weight can be reduced and heat radiation and power output can be preferably enhanced.

In the first embodiment, the first piston 31 and the second piston 32 are operated so that their displacement amounts can be equal to each other but their displacement phases can be opposite to each other. The vibrations accompanying the movements of the first piston 31 and the second piston 32 are thereby offset by each other. This eliminates necessity of increasing the number of the cylinders for decreasing the vibration, resulting in reduction of the vibration without increasing the size of the structure.

In the first embodiment, the uni-flow scavenging is adopted within the combustion chamber 23. The residual combustion gases within the combustion chamber 23 are decreased, so that combustion efficiency and the efficiency of the free piston engine 20 are enhanced.

Further, in the first embodiment, the control unit 11 detects the displacement amounts of the first movable member 111 and the second movable member 211 from the output electric powers of the first linear motor generator 110 and the second linear motor generator 210, respectively. By the detected displacement amounts, the control unit 11 detects an operating state of the free piston engine 20 to control the free piston engine 20. Therefore, abnormal combustion such as knocking, ignition delay, or accidental ignition can be restricted. Further, the displacement amounts and vibration frequencies of the first piston 31 and the piston 32 are maintained at constant levels. The operating state of the free piston engine 20 can be thereby adjusted properly according to the load. This decreases the fluctuation in the operating state.

(Second Embodiment)

Figure 5:
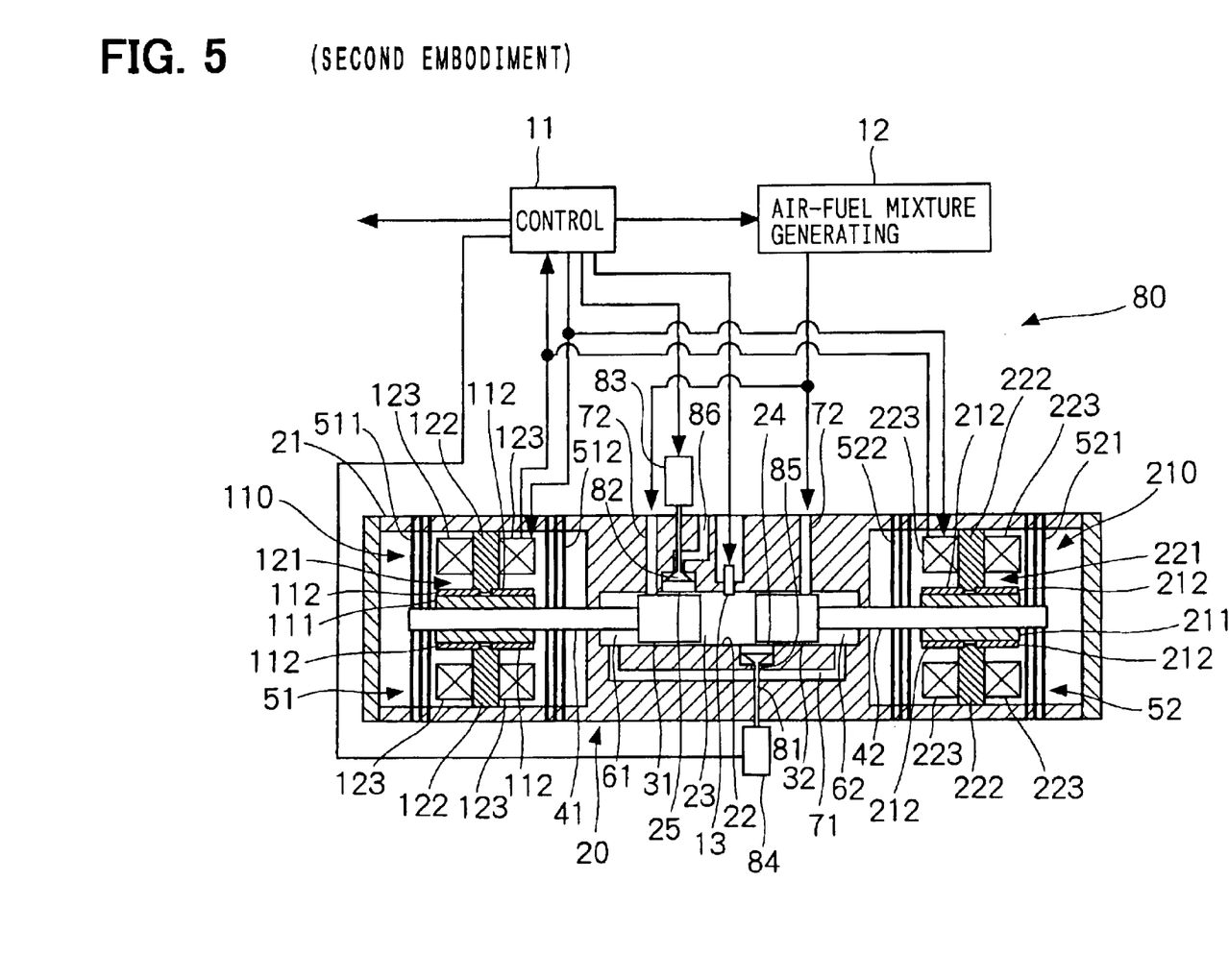
FIG. 5 is a schematic cross sectional view showing a power generation system according to a second embodiment of the present invention.

A power generation system 80 according to a second embodiment will be explained with reference to FIG. 5. Structural elements substantially equal to those in the first embodiment have the same reference numbers, so that the explanation for the equal elements will be removed below.

The free piston engine 20 in the power generation system 80 is provided with an intake valve 81 and an exhaust valve 82 as a valve unit. The power generation system 80 includes an intake valve actuator 83 and an exhaust valve actuator 84, both of which include, e.g., an electromagnetic actuator or a piezoelectric actuator. The intake valve 81 is disposed in a scavenging passage 85, and opens and shuts the connection between the scavenging passage 85 and the combustion chamber 23. The exhaust valve 82 is disposed in an exhaust passage 86, and opens and shuts the connection between the exhaust passage 86 and the combustion chamber 23. The intake valve actuator 83 and the exhaust valve actuator 84 are electrically connected with the control unit 11. The control unit 11 opens and closes the intake valve 81 and the exhaust valve 82 in synchronization to the displacement amounts of the first piston 31 and the second piston 32 detected from the output powers of the first linear motor generator 110 and the second linear motor generator 210.

In the above-described first embodiment, the scavenging passage 71 or the exhaust passage 73 is connected or closed to the combustion chamber 23 only depending on the movement of the first piston 31 or the second piston 32. Therefore, for instance, when the operating state of the free piston engine 20 becomes unsteady and the first piston 31 and the second piston 32 move with different movements or different frequencies, the timing for the connection between the scavenging passage 71 and the combustion chamber 23 or between the exhaust passage 73 and the combustion chamber 23 eventually becomes improper. As a result, the discharge of the combustion gases or scavenging of the air-fuel mixture sometimes becomes insufficient.

To solve this problem, in the second embodiment, the intake valve 81 and the exhaust valve 82 are provided so that the connection between the scavenging passage 85 and the combustion chamber 23 or between the exhaust passage 86 and the combustion chamber 23 is operated at proper timings in accordance with the displacement amounts of the first piston 31 and the second piston 32. Consequently, the combustion efficiency of the combustion chamber 23 can be enhanced and the exhaust of the combustion gases including the fuel can be decreased.

(Third Embodiment)

A power generation system 100 according to a third embodiment will be explained with reference to FIGS. 6 to 10. Structural elements substantially equal to those in the first embodiment have the same reference numbers, so that the explanation for the equal elements will be removed below.

Figure 6:
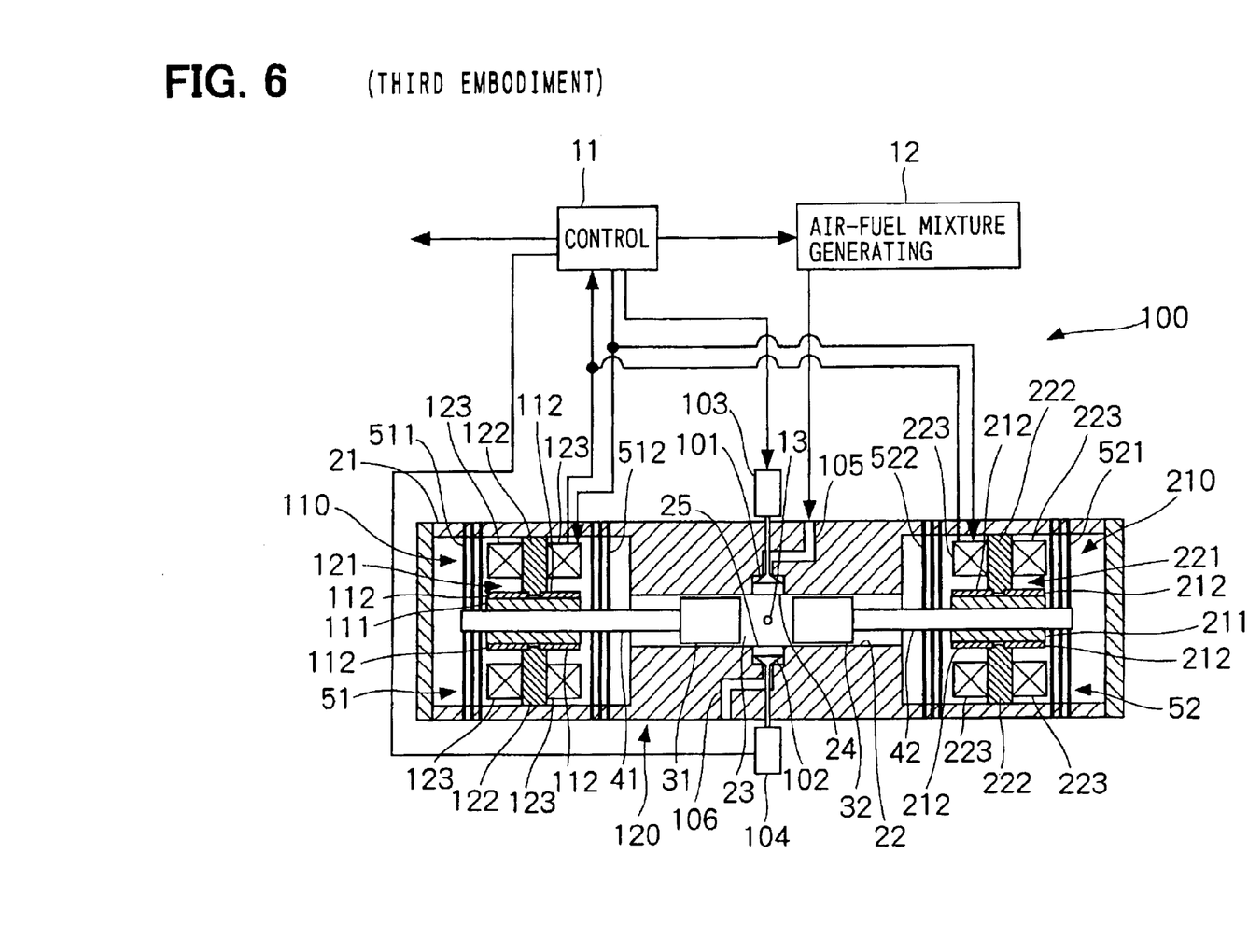
FIG. 6 is a schematic cross sectional view showing a power generation system according to a third embodiment of the present invention.

A free piston engine 120 in the power generation system 100 is provided with an intake valve 101 and an exhaust valve 102 as a valve unit. The power generation system 100 includes an intake valve actuator 103 for opening and closing the intake valve 101 and an exhaust valve actuator 104 for opening and closing the exhaust valve 102. The intake valve 81 is disposed in an intake passage 105, and connects and closes the intake passage 105 to the combustion chamber 23. The exhaust valve 102 is disposed in an exhaust passage 106, and connects and closes the exhaust passage 106 to the combustion chamber 23. The intake valve actuator 103 and the exhaust valve actuator 104 are electrically connected with the control unit 11. The control unit 11 opens and closes the intake valve 101 and the exhaust valve 102 in synchronization to the displacement amounts of the first piston 31 and the second piston 32 detected from the output powers of the first linear motor generator 110 and the second linear motor generator 210, respectively.

The free piston engine 120 in the power generation system 100 in the third embodiment is a four-stroke engine.

Therefore, the combustion chamber 23 is directly connected with the air-fuel mixture generating unit 12 via the intake passage 105, while the combustion chamber 23 is directly connected with the outside of the free piston engine 120 via the exhaust passage 106. This eliminates formation of the sub-chambers rearwards of the first piston 31 and the second piston 32.

Next, operation of the power generation system 100 will be explained below. The free piston engine 120 of the first embodiment is a four-stroke engine to thereby include an intake stroke, a compression stroke, an expansion stroke, and an exhaust stroke.

Figure 7:
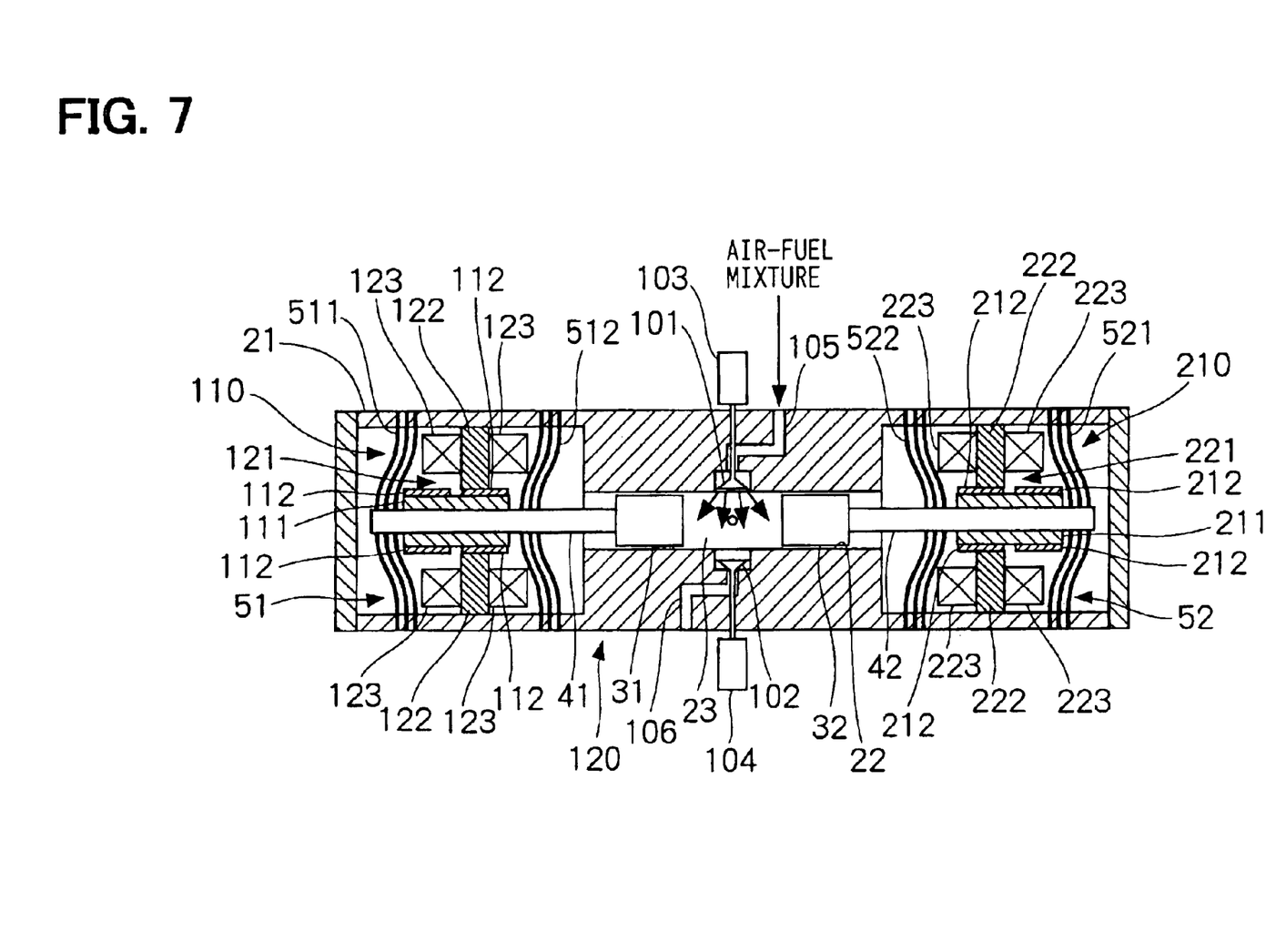
FIG. 7 is a schematic cross sectional view showing a power generation system in an intake stroke according to the third embodiment.

As shown in FIG. 7, under the intake stroke, the first piston 31 and the second piston 32 move from the top dead center towards the bottom dead center. Here, the intake valve 101 is opened, so that the combustion chamber 23 is fluidly connected with the air-fuel mixture generating unit 12 via the intake passage 105. By contrast, the exhaust valve 102 is closed. As the first piston 31 and the second piston 32 move towards the bottom dead center, the internal pressure in the combustion chamber 23 is decreased, so that the air-fuel mixture generated in the air-fuel mixture generating unit 12 is charged into the combustion chamber 23. Further, by moving of the first piston 31 and the second piston 32 from the top dead center towards the bottom dead center, repulsive energy that pushes back the first piston 31 and the second piston 32 towards the combustion chamber 23 is accumulated in the first leaf-spring unit 51 and the second leaf-spring unit 52. Here, under the intake stroke, the force that drives the first piston 31 and the second piston 32 towards the bottom dead center is sometimes insufficient in the first leaf-spring unit 51 and the second leaf-spring unit 52, so that the control unit 11 feeds the first linear motor generator 110 and the second linear motor generator 210 with electric power. This causes the first linear motor generator 110 and the second linear motor generator 210 to assist the movements of the first piston 31 and the second piston 32, respectively.

Figure 8:
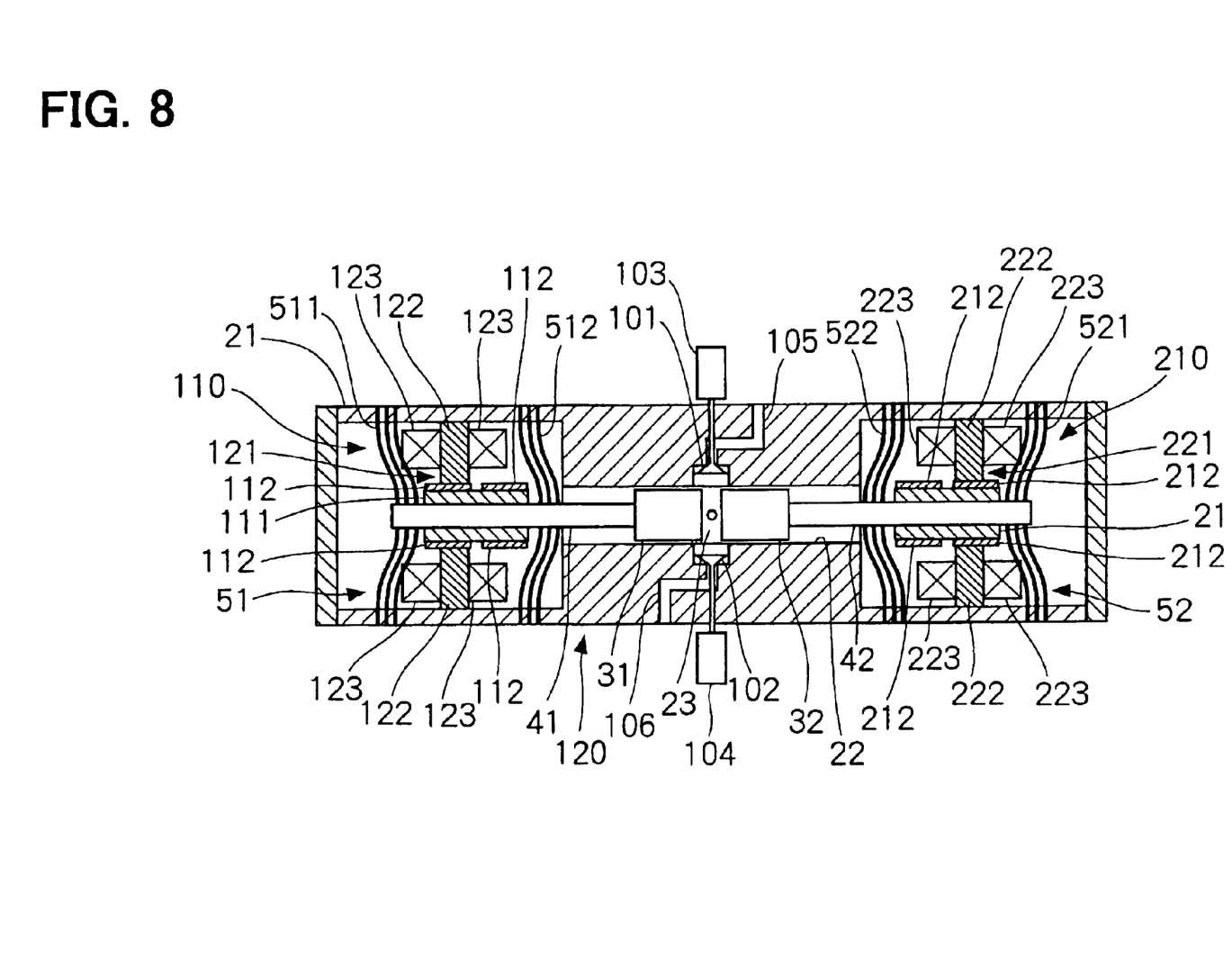
FIG. 8 is a schematic cross sectional view showing a power generation system in a compression stroke according to the third embodiment.

When the first piston 31 and the second piston 32 reach the bottom dead center, the free piston engine 120 completes the intake stroke and starts the compression stroke shown in FIG. 8. Under the compression stroke, the first piston 31 and the second piston 32 move from the bottom dead center towards the top dead center. Here, both the intake valve 101 and the exhaust valve 102 are being closed. Moving of the first piston 31 and the second piston 32 towards the top dead center increases the internal pressure in the combustion chamber 23. Since the combustion chamber 23 is blocked off from the outside, the internal temperature and pressure are increased within the combustion chamber 23. Under the compression stroke, by the energies accumulated in the first leaf-spring unit 51 and the second leaf-spring unit 52, the first piston 31 and the second piston 32 are pushed back towards the combustion chamber 23, respectively. When the energies accumulated in the first leaf-spring unit 51 and the second leaf-spring unit 52 because of the elastic deformations are insufficient in moving of the first piston 31 and the second piston 32, the control unit 11 feeds the first linear motor generator 110 and the second linear motor generator 210 with the electric powers, to assist the first piston 31 and the second piston 32 to move, respectively. Here, in the first piston 31 and the second piston 32, the movement direction under the compression stroke is opposite to that in the intake stroke. Therefore, the negative and positive relationship of the electric power that the control unit 11 feeds to the first linear motor generator 110 and the second linear motor generator 210 under the compression stroke is opposite to that in the intake stroke.

Figure 9:
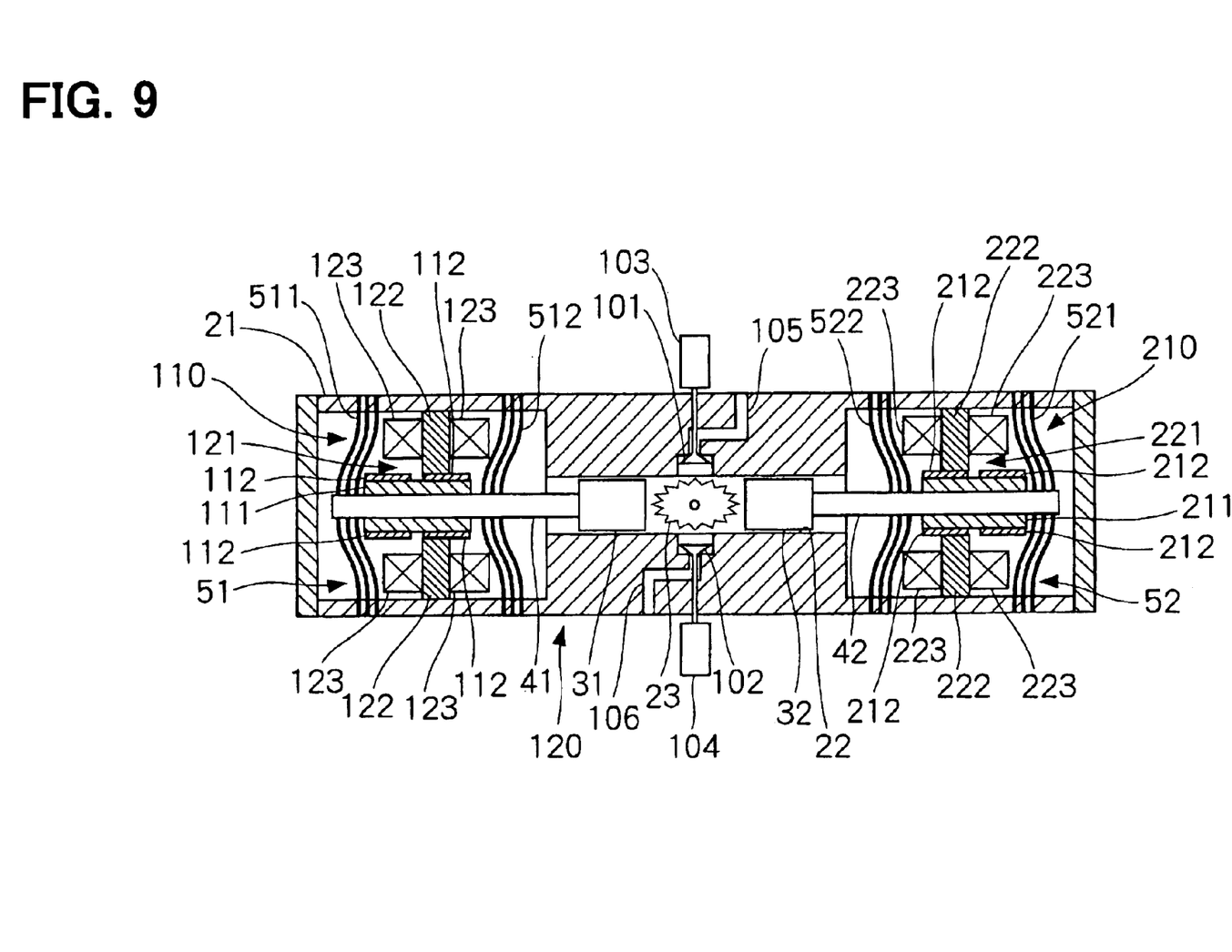
FIG. 9 is a schematic cross sectional view showing a power generation system in an expansion stroke according to the third embodiment.

When the first piston 31 and the second piston 32 reach the top dead center, the free piston engine 120 completes the compression stroke and starts the expansion stroke shown in FIG. 9. Under the compression stroke, as the first piston 31 and the second piston 32 reach the top dead center, the control unit 11 outputs an ignition control signal to the ignition plug 13 in synchronization to reaching the top dead center. This causes the ignition plug 13 to ignite the air-fuel mixture compressed within the combustion chamber 23, to result in explosion of the air-fuel mixture within the combustion chamber 23. Here, both the intake valve 101 and the exhaust valve 102 are being closed. The combustion gases that are produced by the air-fuel mixture burning because of the ignition are expanded, so that the first piston 31 and the second piston 32 are pushed back and moved towards the bottom dead center. Moving of the first piston 31 and the second piston 32 towards the bottom dead center accumulates in the first leaf-spring unit 51 and the second leaf-spring unit 52 the energy that pushes back the first piston 31 and the second piston 32 towards the combustion chamber 23, respectively. Here, when the movement of the first piston 31 and the second piston 32 becomes excessive because of the expansion of the combustion gases, the control unit 11 feeds the first linear motor generator 110 and the second linear motor generator 210 with the electric power so that the excessive movement of the first piston 31 and the second piston 32 can be restricted, respectively.

Figure 10:
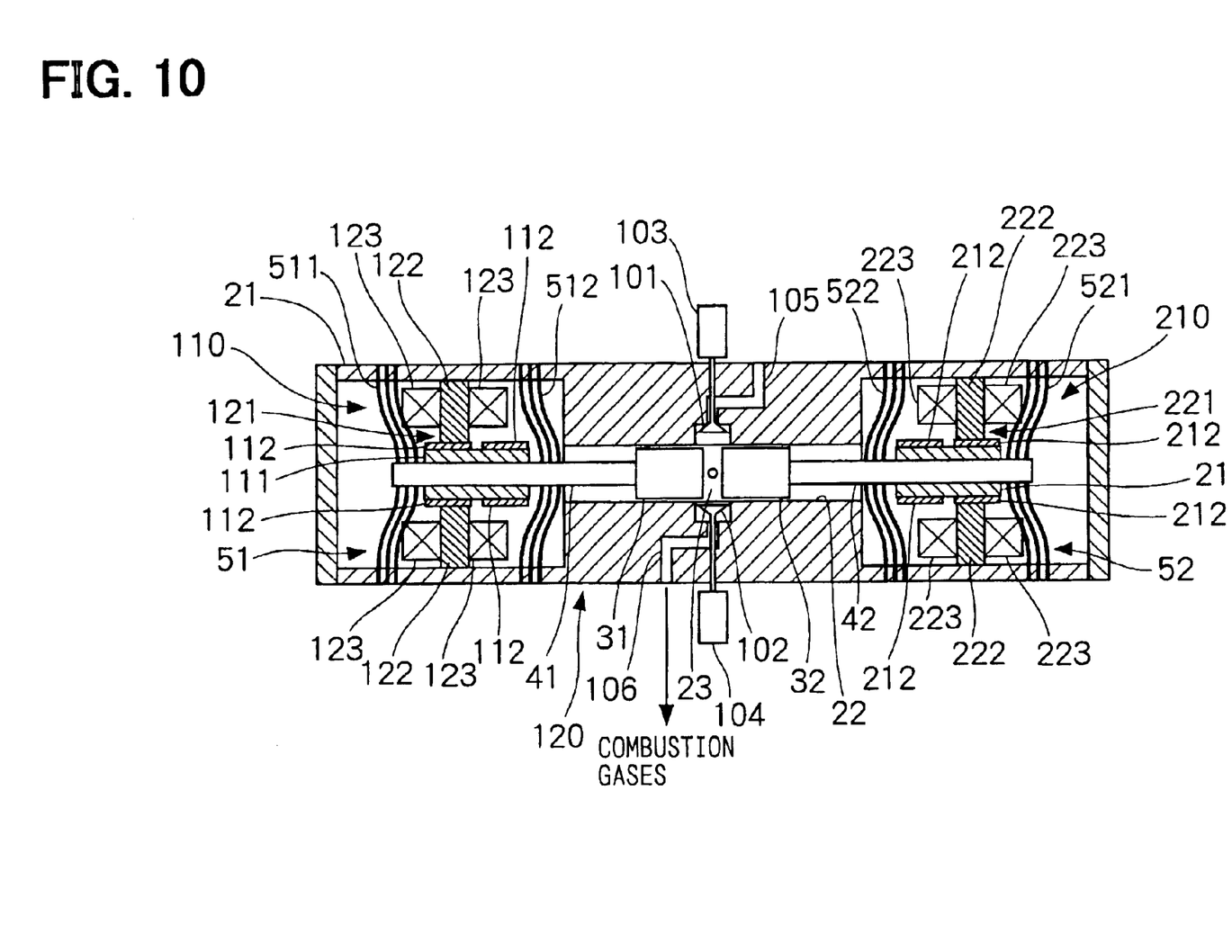
FIG. 10 is a schematic cross sectional view showing a power generation system in an exhaust stroke according to the third embodiment.

When the first piston 31 and the second piston 32 reach the bottom dead center, the free piston engine 120 completes the expansion stroke and starts the exhaust stroke shown in FIG. 10. Under the exhaust stroke, the first piston 31 and the second piston 32 are pushed back towards the combustion chamber 23 by the energy accumulated in the first leaf-spring unit 51 and the second leaf-spring unit 52. Here, the exhaust valve 102 is opened, while the intake valve 101 continues to be closed. This causes the exhaust gases within the combustion chamber 23 to be pushed off from the combustion chamber 23 to the exhaust passage 106 while the first piston 31 and the second piston 32 move towards the top dead center. The combustion gases are thereby discharged to the outside of the combustion chamber 23.

When the exhaust stroke is completed, the first piston 31 and the second piston 32 move again from the top dead center towards the bottom dead center. Here, the exhaust valve 102 is closed, while the intake valve 101 is opened. This advances the free piston engine 120 to the intake stroke again, then repeating the above strokes.

In the third embodiment, the four-stroke engine is adopted as the free piston engine 120. This eliminates the necessity of sub-chambers located rewards of the first piston 31 and the second piston 42, simplifying the structure. Adopting of the four-stroke engine can restrict the residual of the combustion gases in the combustion chamber 23 or the leakage of the combustion gases to the outside of the combustion chamber 23.

(Others)

In the above embodiments, this invention is directed to a free piston engine accommodating two pistons. However, a free piston engine can accommodate four or more pistons by combining the multiple above-explained free piston engine that has two pistons.

Further, in the above embodiments, in the free piston engine, two pistons are disposed in a row (or in series) in the same axis; however, the pistons can be disposed in a star-shaped layout or the like instead of the series layout.

It will be obvious to those skilled in the art that various changes may be made in the above-described embodiments of the present invention. However, the scope of the present invention should be determined by the following claims.

What is claimed is:

1. A free piston engine comprising:
 a housing that includes a cylinder;
 a first piston that is contained within the cylinder and capable of being axially reciprocated;
 a second piston that is contained within the cylinder, capable of being axially reciprocated, and opposed to the first piston, wherein a combustion chamber is formed as a space surrounded by the first piston, the second piston, and the housing;
 a first shaft that is connected with the first piston at a first end of the first piston and capable of being axially reciprocated along with the first piston, wherein the first end of the first piston is opposite to a second end of the first piston, wherein the second end of the first piston faces the combustion chamber;
 a second shaft that is connected with the second piston at a third end of the second piston and capable of being axially reciprocated along with the second piston, wherein the third end of the second piston is opposite to a fourth end of the second piston, wherein the fourth end of the second piston faces the combustion chamber;
 a first spring unit that is connected with the first shaft, supports the first piston and the first shaft, applies to the first shaft a force that corresponds to a first displacement of the first piston and has a direction opposite to a direction of the first displacement; and
 a second spring unit that is connected with the second shaft, supports the second piston and the second shaft, applies to the second shaft a force that corresponds to a second displacement of the second piston and has a direction opposite to a direction of the second displacement.

2. The free piston engine of claim 1,
 wherein the first spring unit includes a first parallel-leaf spring portion that allows axial movement in the first shaft and limits radial movement and circumferential rotational movement in the first shaft, while the second spring unit includes a second parallel-leaf spring portion that allows axial movement in the second shaft and limits radial movement and circumferential rotational movement in the second shaft.

3. The free piston engine of claim 2,
 wherein each of the first parallel-leaf spring portion and the second parallel-leaf spring portion includes a plurality of sub-portions that are disposed axially in a row in each of the first shaft and the second shaft.

4. The free piston engine of claim 1,
 wherein the first piston, the first shaft, and the first spring unit are included in a first vibration system,
 wherein the second piston, the second shaft, and the second spring unit are included in a second vibration system, and
 wherein an axial displacement in the first vibration system is equal to an axial displacement in the second vibration system, while a phase in a vibration in the first vibration system is opposite to a phase in a vibration in the second vibration system.

5. The free piston engine of claim 1, further comprising:
 a feeding unit that feeds an air-fuel mixture to the combustion chamber; and
 an exhaust unit that discharges combustion gases from the combustion chamber, wherein the feeding unit and the exhaust unit are disposed so that uni-flow scavenging is formed within the combustion chamber.

6. The free piston engine of claim 5,
wherein each of the feeding unit and the exhaust unit includes a valve unit that opens and closes in synchronization to reciprocated movements of the first piston and the second piston so that the air-fuel mixture is fed to the combustion chamber and the combustion gases are discharged from the combustion chamber.

7. The free piston engine of claim 1, further comprising:
a detecting unit that detects the first displacement of the first piston and the second displacement of the second piston; and
an ignition unit that ignites an air-fuel mixture fed to the combustion chamber based on at least one of the first displacement detected by the detecting unit and the second displacement detected by the detecting unit.

8. A power generation system comprising:
a free piston engine that includes
a housing that includes a cylinder,
a first piston that is contained within the cylinder and capable of being axially reciprocated,
a second piston that is contained within the cylinder, capable of being axially reciprocated, and opposed to the first piston, wherein a combustion chamber is formed as a space surrounded by the first piston, the second piston, and the housing,
a first shaft that is connected with the first piston at a first end of the first piston and capable of being axially reciprocated along with the first piston, wherein the first end of the first piston is opposite to a second end of the first piston, wherein the second end of the first piston faces the combustion chamber,
a second shaft that is connected with the second piston at a third end of the second piston and capable of being axially reciprocated along with the second piston, wherein the third end of the second piston is opposite to a fourth end of the second piston, wherein the fourth end of the second piston faces the combustion chamber,
a first spring unit that is connected with the first shaft, supports the first piston and the first shaft, applies to the first shaft a force that corresponds to a first displacement of the first piston and has a direction opposite to a direction of the first displacement, and
a second spring unit that is connected with the second shaft, supports the second piston and the second shaft, applies to the second shaft a force that corresponds to a second displacement of the second piston and has a direction opposite to a direction of the second displacement;
a first linear motor generator that includes
a first movable member that is provided in the first shaft and axially reciprocated along with the first piston, and
a first stator that is provided around an outer surface of the first movable member,
wherein the first stator generates an electric power because of a magnetic field variation generated around the first movable member by movement of the first shaft and also generates a magnetic field around the first movable member to thereby apply a force to the first movable member; and
a second linear motor generator that includes
a second movable member that is provided in the second shaft and axially reciprocated along with the second piston, and
a second stator that is provided around an outer surface of the second movable member,
wherein the second stator generates an electric power because of a magnetic field variation generated around the second movable member by movement of the second shaft and also generates a magnetic field around the second movable member to thereby apply a force to the second movable member.

9. The power generation system of claim 8, further comprising:
a position detecting unit that detects the first displacement of the first piston and the second displacement of the second piston; and
a control unit that adjusts the magnetic field of the first linear motor generator and the magnetic field of the second linear motor generator and controls the first displacement and the second displacement so that the first displacement and the second displacement are maintained at constants, based on the first displacement detected by the detecting unit and the second displacement detected by the detecting unit.

10. The power generation system of claim 8, further comprising:
a position detecting unit that detects the first displacement of the first piston and the second displacement of the second piston; and
a control unit that adjusts the magnetic field of the first linear motor generator and the magnetic field of the second linear motor generator and controls a vibration frequency of the first piston and a vibration frequency of the second piston so that the vibration frequency of the first piston and the vibration frequency of the second piston are maintained at constants, based on the first displacement detected by the detecting unit and the second displacement detected by the detecting unit.

11. The power generation system of claim 8,
wherein the first spring unit includes a first parallel-leaf spring portion that allows axial movement in the first shaft and limits radial movement and circumferential rotational movement in the first shaft, while the second spring unit includes a second parallel-leaf spring portion that allows axial movement in the second shaft and limits radial movement and circumferential rotational movement in the second shaft.

12. The power generation system of claim 11,
wherein each of the first parallel-leaf spring portion and the second parallel-leaf spring portion includes a plurality of sub-portions that are disposed axially in a row in each of the first shaft and the second shaft.

13. The power generation system of claim 8,
wherein the first piston, the first shaft, and the first spring unit are included in a first vibration system,
wherein the second piston, the second shaft, and the second spring unit are included in a second vibration system, and
wherein an axial displacement in the first vibration system is equal to an axial displacement in the second vibration system, while a phase in a vibration in the first vibration system is opposite to a phase in a vibration in the second vibration system.

14. The power generation system of claim 8, further comprising:
a feeding unit that feeds an air-fuel mixture to the combustion chamber; and
an exhaust unit that discharges combustion gases from the combustion chamber, wherein the feeding unit and the exhaust unit are disposed so that uni-flow scavenging is formed within the combustion chamber.

15. The power generation system of claim 14,
wherein each of the feeding unit and the exhaust unit includes a valve unit that opens and closes in synchronization to reciprocated movements of the first piston and the second piston so that the air-fuel mixture is fed to the combustion chamber and the combustion gases are discharged from the combustion chamber.

16. The power generation system of claim 8, further comprising:
a detecting unit that detects the first displacement of the first piston and the second displacement of the second piston; and
an ignition unit that ignites an air-fuel mixture fed to the combustion chamber based on at least one of the first displacement detected by the detecting unit and the second displacement detected by the detecting unit.

* * * * *